United States Patent
Schaffert (10) Patent No.: US 9,693,497 B2
(45) Date of Patent: Jul. 4, 2017

(54) MOUNTING BRACKET FOR AGRICULTURAL ROW UNIT

(71) Applicant: SCHAFFERT MANUFACTURING COMPANY, INC., Indianola, NE (US)

(72) Inventor: Paul E. Schaffert, Indianola, NE (US)

(73) Assignee: Schaffert Manufacturing Company, Inc., Indianola, NE (US)

( * ) Notice: Subject to any disclaimer, the term of this patent is extended or adjusted under 35 U.S.C. 154(b) by 62 days.

(21) Appl. No.: 14/202,435

(22) Filed: Mar. 10, 2014

(65) Prior Publication Data

US 2014/0262371 A1 Sep. 18, 2014

Related U.S. Application Data

(60) Provisional application No. 61/781,256, filed on Mar. 14, 2013.

(51) Int. Cl.
*A01C 5/06* (2006.01)

(52) U.S. Cl.
CPC .................................. *A01C 5/066* (2013.01)

(58) Field of Classification Search
CPC .. A01C 5/066; A01C 5/08; A01C 5/06; A01C 5/068
See application file for complete search history.

(56) References Cited

U.S. PATENT DOCUMENTS

| | | |
|---|---|---|
| 13,683 A | 10/1855 | McCormick |
| 35,510 A | 6/1862 | De Haven |
| 122,299 A | 12/1871 | Wight et al. |
| 176,708 A | 4/1876 | Templin |
| 203,207 A | 4/1878 | Springer |
| 211,601 A | 1/1879 | Springer |
| 252,265 A | 1/1882 | Scofield |
| 288,661 A | 11/1883 | Purdy et al. |
| 308,327 A | 11/1884 | Runstetler |
| 322,841 A | 7/1885 | Miskimen |
| 555,897 A | 3/1896 | Crane |
| 889,947 A | 6/1908 | Miller |
| 909,137 A | 1/1909 | Bellerive |
| 1,473,297 A | 11/1923 | Knight |
| 2,533,374 A | 12/1950 | Hyland |
| 2,805,486 A | 9/1957 | Barrett |
| 2,849,969 A | 9/1958 | Taylor |
| 2,872,883 A | 2/1959 | Padrick |

(Continued)

FOREIGN PATENT DOCUMENTS

| | | |
|---|---|---|
| DE | 3321490 A1 | 12/1984 |
| DE | 3441610 A1 | 5/1986 |

OTHER PUBLICATIONS

Author Unknown, "1200 Series Advanced Seed Meter Planters", Case lil, 2005, 1-35.

(Continued)

*Primary Examiner* — Matthew D Troutman
(74) *Attorney, Agent, or Firm* — Dorsey & Whitney, LLP (57) ABSTRACT

A row unit for an agricultural planter is provided. The row unit may include a body operably coupled to the agricultural planter, a bracket secured to the body, and a chassis pivotably coupled to the bracket. The bracket may include a top wall and opposing sidewalls extending downwardly from the top wall. The chassis may be coupled to the bracket beneath the top wall of the bracket.

20 Claims, 9 Drawing Sheets

(56) References Cited

U.S. PATENT DOCUMENTS

| | | | |
|---|---|---|---|
| 3,115,192 A | 12/1963 | Bushmeyer | |
| 3,177,830 A * | 4/1965 | Zimmerman | A01C 5/06 111/134 |
| 3,336,885 A | 8/1967 | Lebow | |
| 3,599,729 A | 8/1971 | Greemore | |
| 3,666,572 A | 5/1972 | Nakagawa et al. | |
| 3,895,589 A | 7/1975 | Garner et al. | |
| 4,108,089 A | 8/1978 | van der Lely | |
| 4,148,267 A | 4/1979 | Bennett et al. | |
| 4,253,412 A | 3/1981 | Hogenson | |
| 4,276,836 A | 7/1981 | Pust | |
| 4,294,181 A | 10/1981 | Smith | |
| 4,373,455 A | 2/1983 | Friggstad | |
| 4,398,478 A * | 8/1983 | Frase | A01C 5/066 111/137 |
| 4,542,705 A | 9/1985 | Orth | |
| 4,565,141 A | 1/1986 | Kopecky | |
| 4,580,507 A | 4/1986 | Dreyer et al. | |
| 4,607,581 A | 8/1986 | Kopecky | |
| 4,628,841 A | 12/1986 | Powilleit | |
| 4,671,193 A | 6/1987 | States | |
| 4,674,419 A | 6/1987 | Kopecky | |
| 4,819,737 A * | 4/1989 | Frase | A01B 39/14 172/156 |
| 4,911,090 A | 3/1990 | Schimke | |
| 5,078,528 A | 1/1992 | Schmidt | |
| 5,092,255 A | 3/1992 | Long et al. | |
| 5,361,848 A | 11/1994 | Fleischer et al. | |
| 5,375,542 A | 12/1994 | Schaffert | |
| 5,398,771 A * | 3/1995 | Hornung | A01B 73/065 111/164 |
| 5,425,318 A | 6/1995 | Keeton | |
| 5,640,915 A | 6/1997 | Schaffert | |
| 5,673,638 A | 10/1997 | Keeton | |
| 5,730,074 A | 3/1998 | Peter | |
| 5,852,982 A | 12/1998 | Peter | |
| 5,884,711 A | 3/1999 | Shoup | |
| 5,904,107 A | 5/1999 | Kester | |
| 5,918,557 A | 7/1999 | Schaffert | |
| 5,996,514 A | 12/1999 | Arriola et al. | |
| 6,082,274 A | 7/2000 | Peter | |
| 6,082,275 A | 7/2000 | Schaffert | |
| 6,119,608 A | 9/2000 | Peterson et al. | |
| 6,148,747 A | 11/2000 | Deckler et al. | |
| D440,985 S | 4/2001 | Noonan et al. | |
| 6,209,466 B1 | 4/2001 | Wodrich | |
| 6,220,191 B1 | 4/2001 | Peter | |
| 6,283,050 B1 | 9/2001 | Schaffert | |
| 6,321,667 B1 | 11/2001 | Shoup | |
| 6,453,832 B1 | 9/2002 | Schaffert | |
| 6,530,334 B2 | 3/2003 | Hagny | |
| 6,640,732 B2 * | 11/2003 | Prairie | A01B 71/02 111/167 |
| 6,763,773 B2 | 7/2004 | Schaffert | |
| 7,121,216 B2 | 10/2006 | Schaffert | |
| 7,360,495 B1 | 4/2008 | Martin | |
| 7,410,005 B2 * | 8/2008 | Lung | A01C 5/066 111/156 |
| 7,552,689 B2 | 6/2009 | Schaffert | |
| 7,581,503 B2 | 9/2009 | Martin | |
| 7,707,952 B2 | 5/2010 | Schaffert | |
| 7,975,629 B1 * | 7/2011 | Martin | A01C 5/066 111/140 |
| 8,047,301 B2 * | 11/2011 | Friggstad | A01C 7/203 111/163 |
| 8,356,563 B2 | 1/2013 | Schaffert | |
| 9,204,590 B2 * | 12/2015 | Schaffert | A01C 5/04 |
| 9,232,689 B2 * | 1/2016 | Trevino | A01C 7/06 |
| 2002/0078869 A1 | 6/2002 | Brummelhuis | |
| 2003/0051650 A1 | 3/2003 | Engelke et al. | |
| 2005/0072344 A1 | 4/2005 | Kester | |
| 2005/0155536 A1 | 7/2005 | Wendte et al. | |
| 2007/0113763 A1 | 5/2007 | Schaffert | |
| 2007/0278272 A1 | 12/2007 | Fast | |
| 2008/0011208 A1 | 1/2008 | Martin | |
| 2008/0066662 A1 | 3/2008 | Hesla | |
| 2008/0257237 A1 * | 10/2008 | Friesen | A01C 5/064 111/150 |
| 2008/0303238 A1 | 12/2008 | Fichter | |
| 2009/0000796 A1 | 1/2009 | Cooper et al. | |
| 2009/0056962 A1 * | 3/2009 | Martin | A01C 5/066 172/551 |
| 2009/0084295 A1 | 4/2009 | Schaffert | |
| 2009/0235853 A1 * | 9/2009 | Schaffert | A01C 5/064 111/163 |
| 2013/0074747 A1 | 3/2013 | Schaffert | |

OTHER PUBLICATIONS

Author Unknown, "3000 Series Kinze Planters", 2003, 3-6 and 12.
Author Unknown, "8000 Series Planters: Simply Advanced", White Planters, 2001, 13-15.
Author Unknown, "Brochure: The Precision Vacuum Planter, NG Plus Series", A.T.I., Inc., Monosem, Lenexa, Kansas, at least as early as Dec. 21, 2007, and Photos A-G, Dec. 21, 2007, 10 pages.
Author Unknown, "Changing Planting Depth", at least as early as Dec. 21, 2007, Dec. 21, 2007, 3 pages.
Author Unknown, "Cost-Effective Solutions for Real-World Needs", Yetter Profitable Solutions, at least as early as Dec. 21, 2007, Dec. 21, 2007, 1-27.
Author Unknown, "Dawn 1572/1500 Coulter Combo", Jul. 28, 2004, Jul. 28, 2004, 2 pages.
Author Unknown, "Dawn Curvtine™ Closing Wheel", 1997, 2 pages.
Author Unknown, "Dawn Trashwheels Row Cleaner", at least as early as Dec. 21, 2007, Dec. 21, 2007, 1 page.
Author Unknown, "Ferti-Placer", Schaffert Manufacturing Co., Inc., at least as early as Dec. 21, 2007, Dec. 21, 2007, 2 pages.
Author Unknown, "Groff AG Improvements, LLC", at least as early as Dec. 21, 2007, Dec. 21, 2007, 4 pages.
Author Unknown, "Hawkins Manufacturing Inc.", at least as early as 2002, 2002, 1 page.
Author Unknown, "Heavy-Duty Coulter", at least as early as Dec. 21, 2007, Dec. 21, 2007, 3 pages.
Author Unknown, "http://precision_planting.com/html/keeton. html", at least as early as Dec. 30, 2000, Dec. 30, 2000, 1 page.
Author Unknown, "Keeton Seed Firmer", J & K Enterprises, 1994, 2 pages.
Author Unknown, "Keeton Seed Firmer, Precision Planting", at least as early as Apr. 9, 2001, Apr. 9, 2001, 4 pages.
Author Unknown, "Photos Labeled "Photo A" and "Photo B"", Oct. 17, 2007, Oct. 17, 2007, 1 page.
Author Unknown, "Planter "N" Forcer, Planter Fertilizer Attachments online product information description", Hawkins Mfg. Inc. Retrieved from http://www.hawkinsmfg.com/attachments.htm on Dec. 9, 2012, Dec. 9, 2012, 2 pages.
Author Unknown, "Planter Fertilizer Attachments", Hawkins Manufacturing Inc., at least as early as Dec. 21, 2007, Dec. 21, 2007, 4 pages.
Author Unknown, "Seed to Soil Inforcer", Seed Flap, Spring 1995, 1995, 1 page.
Author Unknown, "Sunco: Effectively Moves Trash in All Conditions!", at least as early as Dec. 21, 2007, Dec. 21, 2007, 2 pages.
Author Unknown, "Sunco: Your Solution for Accurate Starter Fertilizer Placement", at least as early as Dec. 21, 2007, Dec. 21, 2007, 2 pages.
Author Unknown, "Tine-Tooth Row Tillage Attachment", at least as early as Dec. 21, 2007, Dec. 21, 2007, 9 pages.
Author Unknown, "Tube Alignment Brackets", M & J Cotton Farms, Inc., at least as early as Oct. 30, 1995, Oct. 30, 1995, 1 page.
Author Unknown, "We Know It's All About Strong Roots", Yetter Profitable Solutions, at least as early as Dec. 21, 2007, Dec. 21, 2007, 1-29.
Author Unknown, "Yield-Pro Planters: Unsurpassed in form, function and safety", Great Plains, at least as early as Dec. 21, 2007, Dec. 21, 2007, 4, 5 and 10.

(56) References Cited

OTHER PUBLICATIONS

Author Unknown, "Yield-Pro Planters: Yield increasing row spacing options coupled with best in class productivity and accuracy", at least as early as Dec. 21, 2007, Dec. 21, 2007, 1 page.
Finck, "Where to start with starter fertilizer", Farm Journal, Jan. 1996, Jan. 1996, 15-16.
US Application filed Mar. 23, 2012, U.S. Appl. No. 13/428,922, filed Mar. 23, 2012, 136 pages.
US Utility Patent Application filed Oct. 5, 2012, U.S. Appl. No. 13/646,507, 126 pages.

* cited by examiner

MOUNTING BRACKET FOR AGRICULTURAL ROW UNIT

CROSS-REFERENCE TO RELATED APPLICATIONS

This application claims the benefit of priority pursuant to 35 U.S.C. §119(e) of U.S. provisional application No. 61/781,256 filed Mar. 14, 2013 entitled "Mounting Bracket for Agricultural Row Unit" which is hereby incorporated herein by reference in its entirety.

FIELD

The present disclosure relates to an agricultural device. More specifically, the present disclosure relates to a mounting bracket for an agricultural row unit.

BACKGROUND

Agricultural seed planting is typically accomplished by multi-row planters. Each planter includes a plurality of row units adapted for opening a seed furrow, depositing seeds within the furrow, and closing the seed furrow around the seeds. In some cases, each row unit of the planter also is adapted to open a fertilizer furrow, deposit liquid fertilizer in each fertilizer furrow, and close each fertilizer furrow.

Each row unit of the planter may include a chassis that supports furrow opening discs and furrow closing or press wheels. As each row unit travels along the planting area, the row units may encounter debris, for example, root balls, cobbs, stalks, etc. This debris (also referred to as "trash") may interfere with the operation of the row unit. In some instances, the debris may be caught or lodged between the chassis and the ground, which may result in the row unit dragging the debris throughout the planting area. The caught or lodged debris may further result in debris buildup in front of the row units. The caught or lodged debris, along with any debris buildup, may adversely affect seed placement and/or liquid fertilization distribution. For example, uneven seed placement may result in some seeds being placed too deep or too shallow within the furrow. Also, uneven seed placement may result in some seeds being offset from a row, which may cause the seed to receive inadequate fertilizer and/or water and/or to be trampled by people or equipment if the seed is able to germinate. Similarly, if the liquid fertilizer is offset and is unevenly distributed, some seeds may not receive any fertilizer and may not germinate and others may receive too much fertilizer and may die. Further, the caught or lodged debris, along with any debris buildup, may create trenches in the planting area, which may redirect water flow in the planting area, cause erosion of the planting area (e.g., water erosion), or result in other unintended consequences that may adversely affect the yield of the planting area.

SUMMARY

The present disclosure relates to a row unit for an agricultural planter. The row unit may include a body operably coupled to the agricultural planter, a bracket secured to the body, and a chassis pivotably coupled to the bracket. The bracket may include a top wall and opposing sidewalls extending downwardly from the top wall. The top wall may extend transversely between the sidewalls. The top wall may be oriented substantially perpendicular to the sidewalls, which may be substantially parallel to one another. The chassis may be coupled to the bracket beneath the top wall of the bracket. The chassis may be pivotably coupled to the sidewalls of the bracket. At least two wheels may be rotatably coupled to the chassis. The bracket may be positioned longitudinally along the chassis between the at least two wheels. The bracket may be positioned substantially equidistant between the at least two wheels.

In one example, the body may be a fertilizer system operably coupled to the agricultural planter, the fertilizer system including a fertilizer disc for creating a fertilizer furrow. The bracket included on the fertilizer assembly operably mounts the fertilizer disc in the fertilizer assembly and may at least partially control the movement of the fertilizer disc.

The bracket may or may not be comprised of two substantially identical halves or parts. Each half of the bracket may include one sidewall. Each half of the bracket may define a part of a top wall of the bracket. Each half of the bracket may include an upturned flange. The upturned flange of one half of the bracket may abut the upturned flange of the other half of the bracket. The bracket may include diverging attachment ears, and a portion of a body of the row unit may be positioned laterally between the attachment ears.

The chassis may include a hub and a plurality of arms secured to the hub. The hub may be positioned laterally between opposing sidewalls of a bracket. The hub may be pivotably coupled to the opposing sidewalls. The hub may be positioned beneath a top wall of the bracket. Each of the plurality of arms may include a free end configured to support a rotatable device, such as a disc or wheel. In one implementation, three arms are secured to the hub.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Disclosed herein is a mounting bracket for use with agricultural mobile devices, such as planters, rippers, coulters, drills and the like. The mounting bracket may be associated with a tail section of a row unit (e.g., a drill assembly, fertilizer assembly, planting assembly, ripper, coulter, etc.). The mounting bracket may interconnect a body of the tail section to a chassis of the tail section. The mounting bracket may be positioned on an upper or top side of the chassis, thereby not obstructing a bottom profile of the chassis. This positioning of the mounting bracket may provide the chassis with additional ground clearance compared to conventional mounting brackets.

The mounting bracket also may provide a pivotable connection between the body and the chassis of a tail section of a row unit. As a tractor (or other device) pulls or tows a row unit across a planting area, the row unit may encounter debris, uneven ground, or other disturbances. The mounting bracket may enable the chassis to move over the debris, uneven ground, or other disturbance while the wheels remain in contact with the ground.

Figure 1:
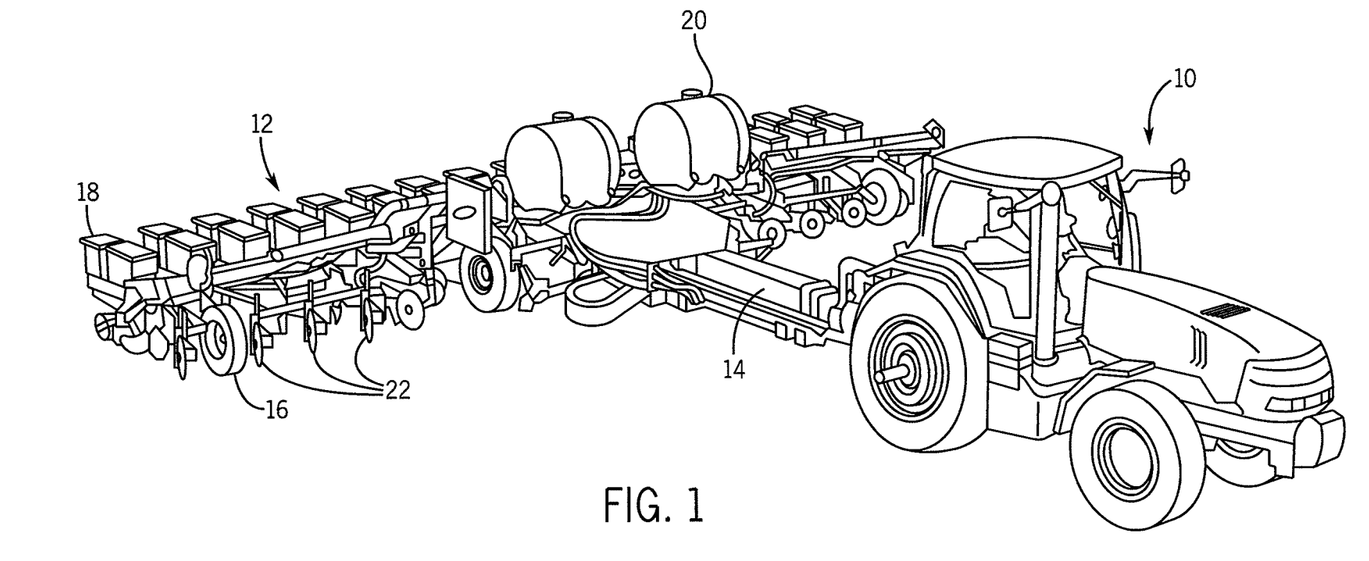
FIG. 1 is an isometric view of a tractor pulling a seed planter.

FIG. 1 illustrates a tractor 10 pulling a planter assembly 12. The planter assembly 12 may include a tongue 14 configured to attach to a rear portion of the tractor 10 and wheels 16 configured to support the planter assembly 12. The planter assembly 12 also may include a seed hopper 18, a fertilizer storage tank 20, and seed discs 22. The seed hopper 18 may be configured store a plurality of seeds before the seeds are deposited into a seed furrow. The fertilizer storage tank 20 may be configured to store fertilizer before the fertilizer is deposited within a seed furrow or an adjacent fertilizer furrow. The seed discs 22 may be configured to create or open seed furrows, for example, as the tractor 10 tows the planter assembly 12 along a field. The seed discs 22 may be configured to create a slit, a slot, or a generally V-shaped furrow in the ground.

Figure 2:
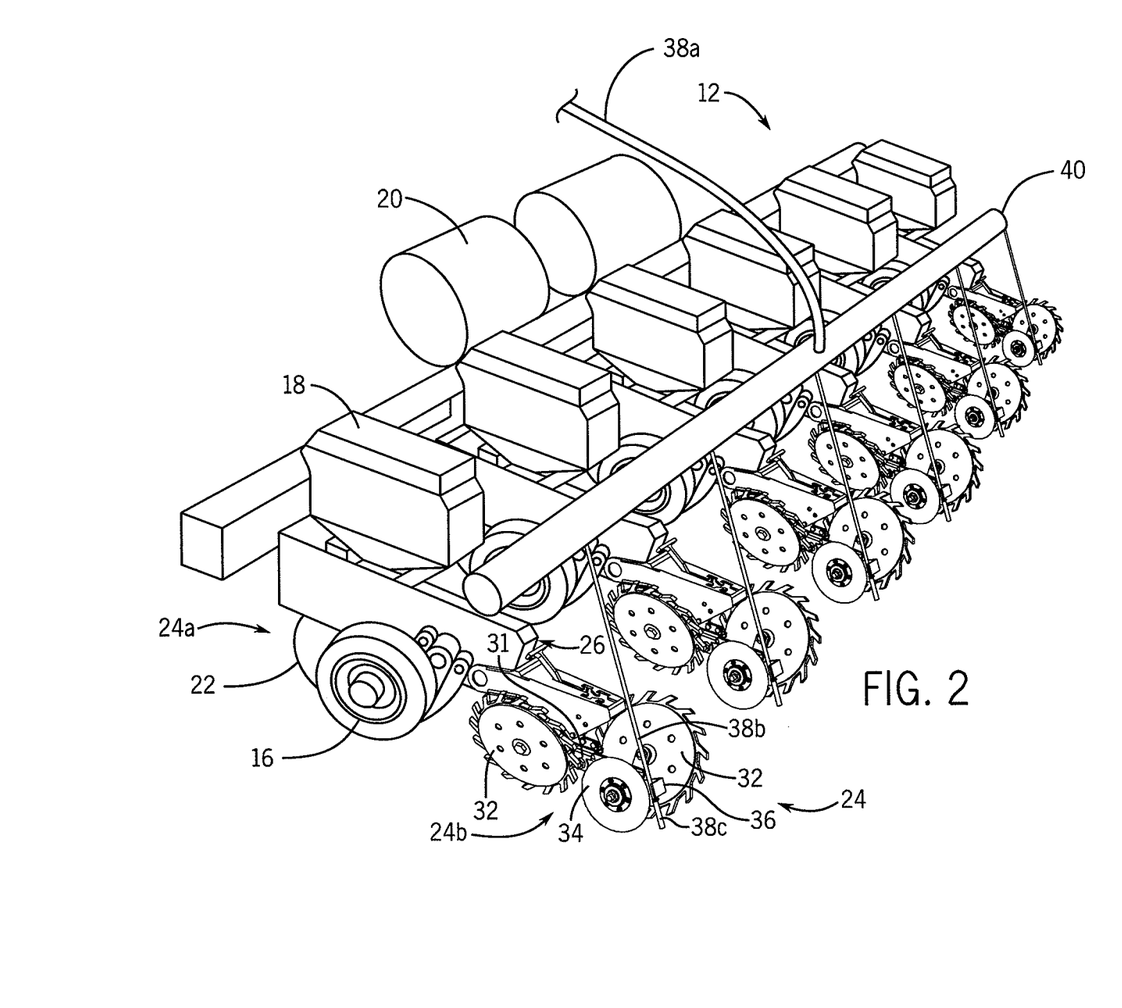
FIG. 2 is top rear partial isometric view of the seed planter illustrated in FIG. 1 including a plurality of row units each having an example mounting bracket.

FIG. 2 illustrates a partial enlarged view of the planter assembly 12. The planter assembly 12 may include a plurality of row units 24 each associated with an individual row of a field. Each row unit 24 may include a front section 24a and a rear or tail section 24b. The front section 24a of each row unit 24 may be include a seed disc 22 configured to open a seed furrow and a depositing assembly 26 configured to deposit seeds within the seed furrow. The depositing assembly 26 may receive seeds from a seed hopper 18 associated with the respective row unit 24. Each depositing assembly 26 may include a seed tube and a rebounder, for example, to deposit the seeds in the seed furrow.

Figure 3:
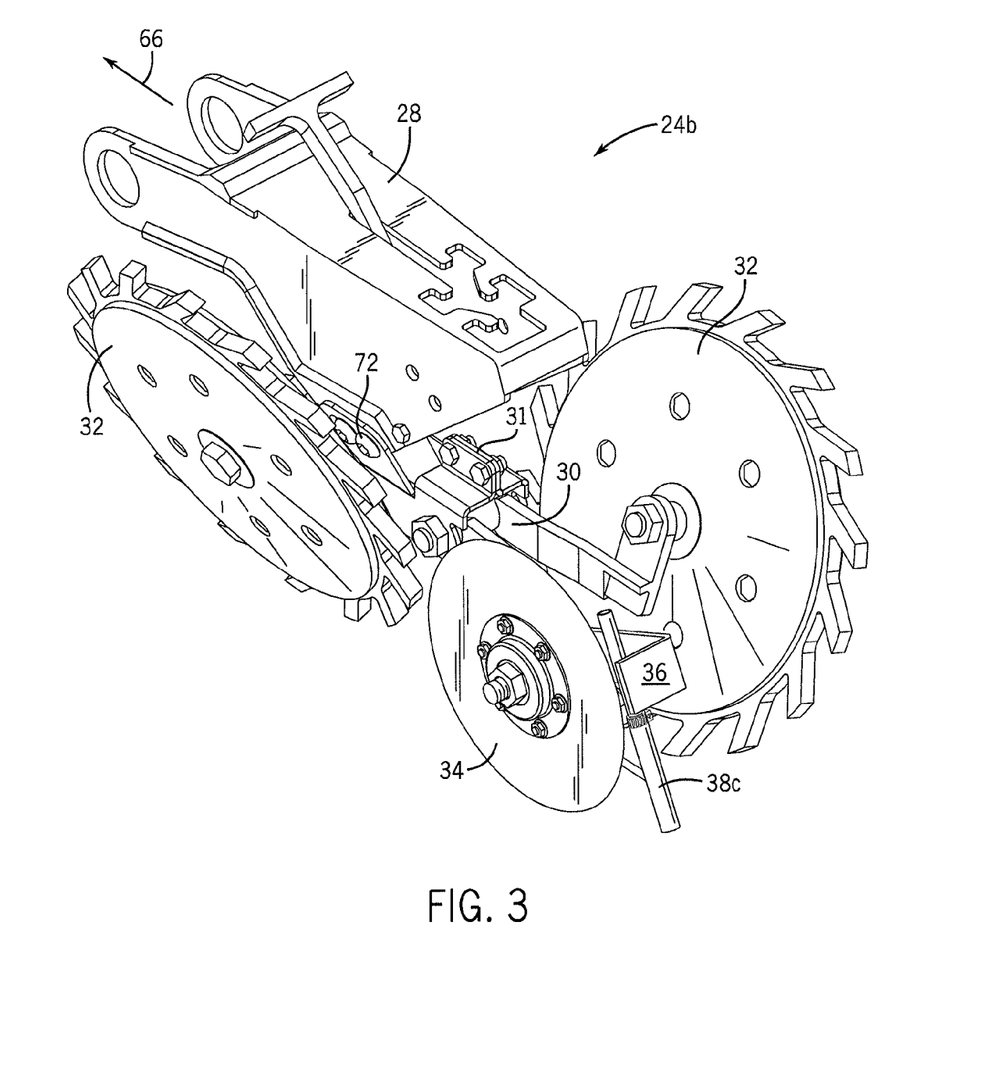
FIG. 3 is a top rear isometric view of one row unit of the plurality of row units illustrated in FIG. 2.

The tail section 24 b of each row unit 24 is enlarged in FIG. 3. The tail section 24 b may include a body 28 configured to connect the tail section 24 b to the front section 24 a of a respective row unit 24, a chassis 30 pivotably coupled to the body 28 by a mounting bracket 31, a pair of longitudinally staggered wheels 32 rotatably coupled to the chassis 30, a fertilizer disc 34 rotatably coupled to the chassis 30, and a fertilizer assembly 36 coupled to the chassis 30. Each of the wheels 32 may have a positive camber such that the bottom portions of the pair of wheels 32 are closer to one another than the top portions of the pair of wheels 32. The pair of wheels 32 associated with an individual row unit 24 may be configured to close a seed furrow after the depositing assembly 26 has placed seeds in the seed furrow. Each wheel 32 may be spiked to assist in closing the seed furrow.

The fertilizer disc 34 may be configured to create or open a fertilizer furrow. The fertilizer disc 34 may be aligned with or laterally offset from the seed disc 22 such that a resulting fertilizer furrow is aligned with or laterally adjacent a respective seed furrow. The fertilizer assembly 36 may be fluidly connected to a fertilizer storage tank 20 (see FIG. 1) via one or more fertilizer tubes 38 and configured to deliver fertilizer into a fertilizer furrow as the tractor 10 pulls the planter assembly 12 through a field.

With reference back to FIG. 2, an example fertilizer system includes a first fertilizer tube 38a that fluidly connects a fertilizer storage tank 20 (see FIG. 1) to a fertilizer bar or manifold 40. A pump (not illustrated) may deliver the fertilizer from the fertilizer storage tank 20 to the fertilizer bar 40 via the first fertilizer tube 38a. A set of second fertilizer tubes 38b may fluidly connect the fertilizer bar 40 to a set of third fertilizer tubes 38c, each of which may be associated with an individual row unit 24. In an alternative implementation, the second and third sets of fertilizer tubes 38b, 38c may be replaced with a single set of fertilizer tubes, each of which transport the fertilizer from the fertilizer bar 40 directly to an individual fertilizer furrow.

Figure 4:
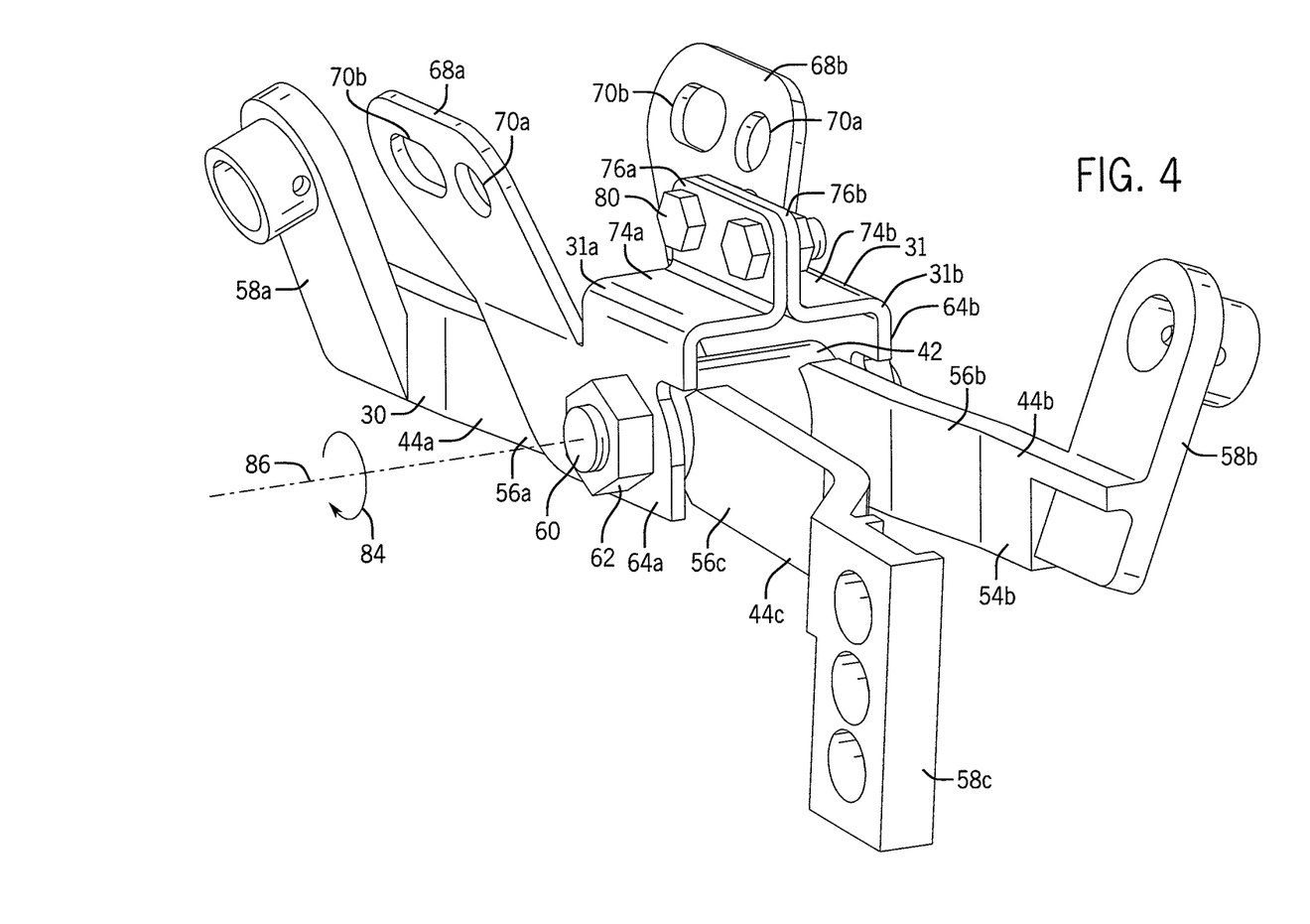
FIG. 4 is a top rear isometric view of a chassis and a mounting bracket of the row unit illustrated in FIG. 3.
Figure 5:
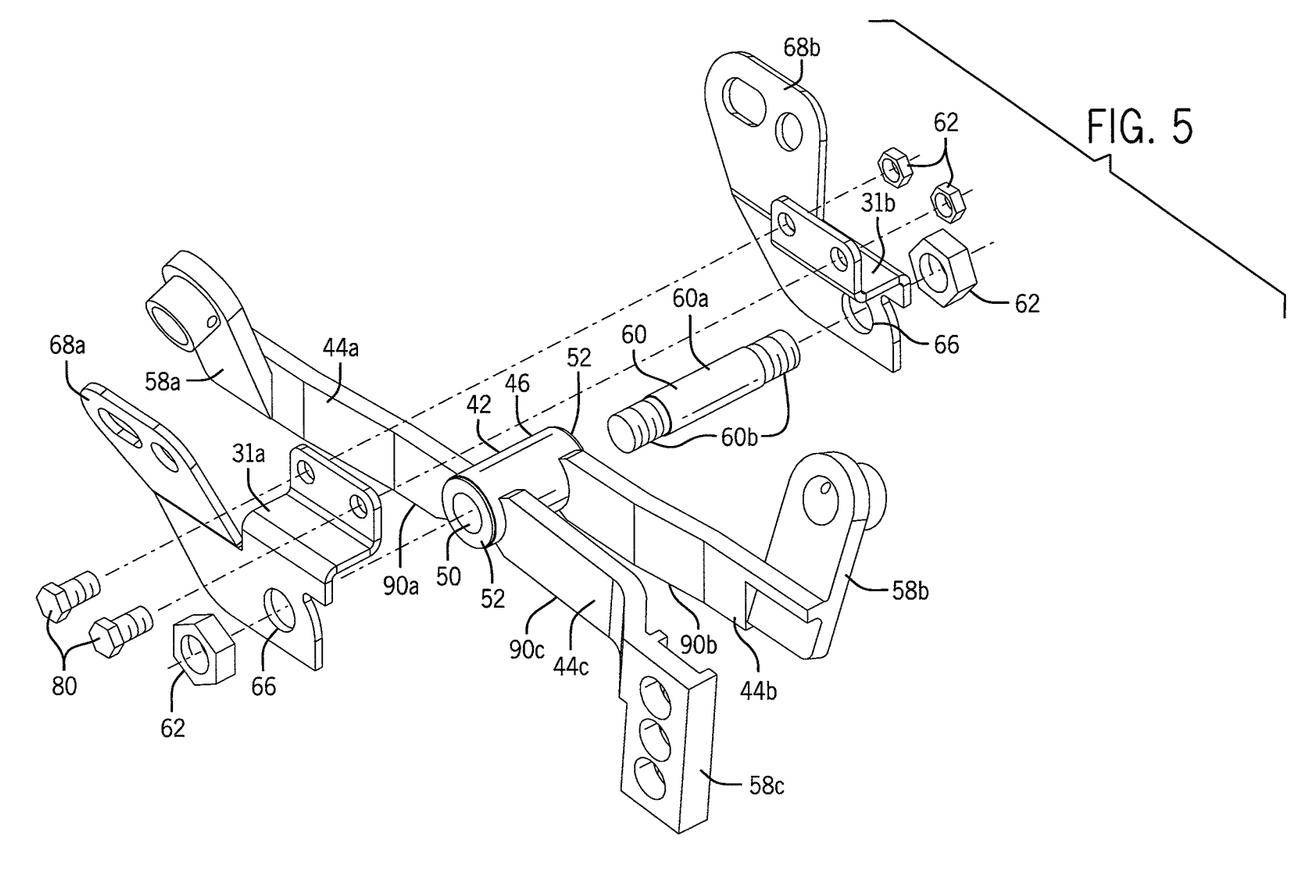
FIG. 5 is an exploded top rear isometric view of the chassis and the mounting bracket illustrated in FIG. 4.

With reference to FIGS. 4-5, the chassis 30 may include a hub 42 and plurality of cantilevered arms 44 connected to and extending away from the hub 42. As illustrated in FIG. 5, the hub 42 may be a hollow body 46 having a substantially cylindrical outer surface 48, a substantially cylindrical inner surface 50, and opposing lateral faces 52. The hub 42 may have a substantially uniform annular wall thickness. The hub 42 may be formed from a substantially cylindrical tube.

Each of the plurality of cantilevered arms 44 may be connected to the substantially cylindrical outer surface 48 of the hub 42. Each of the plurality of cantilevered arms 44 may include a proximal end portion 56 associated with the hub 42 and a distal end portion 58 configured to receive an attachment, such as a wheel 32 or a disc 34. The terms proximal and distal are used herein in relative to the hub 42, unless indicated otherwise.

As illustrated in FIGS. 4-5, the plurality of cantilevered arms 44 may include three arms 44a, 44b, 44c. A first and second cantilevered arm 44a, 44b may extend from opposing sides of the outer surface 58 of the hub 42. The proximal end portions 56a, 56b of the first and second cantilevered arms 44a, 44b may extend from the hub 42 in generally opposite longitudinal directions. The distal end portions 58a, 58b of the first and second cantilevered arms 44a, 44b each may be configured to rotatably support a corresponding press wheel 32 (see FIGS. 3-4).

The third cantilevered arm 44c may extend from the same side of the outer surface 58 of the hub 42 as the second cantilevered arm 44b. The proximal end portion 56c of the third cantilevered arm 44c may be laterally spaced apart from the proximal end portion 56b of the second cantilevered arm 44b. The distal end portion 58c of the third cantilevered arm 44c may be configured to rotatably support a furrow opening disc 34 (see FIGS. 3-4).

With continued reference to FIGS. 4-5, the mounting bracket 31 may be pivotably coupled to the chassis 30 with a fastener, such as a cross pin 60 extending through the hub 42. As illustrated in FIG. 5, the cross pin 60 may be include a central, substantially cylindrical bearing surface 60a and threaded ends 60b. The bearing surface 60a may have a larger outer diameter than the threaded ends 60b. The bearing surface 60a may rotatably bear against the inner surface 50 of the hub 42 during movement of the chassis 30 and the mounting bracket 31 relative to one another. Nuts 62 may be threadably mounted on the threaded ends 60b of the cross pin 60 to secure the mounting bracket 31 to the chassis 30 about the cross pin 60.

Figure 6:
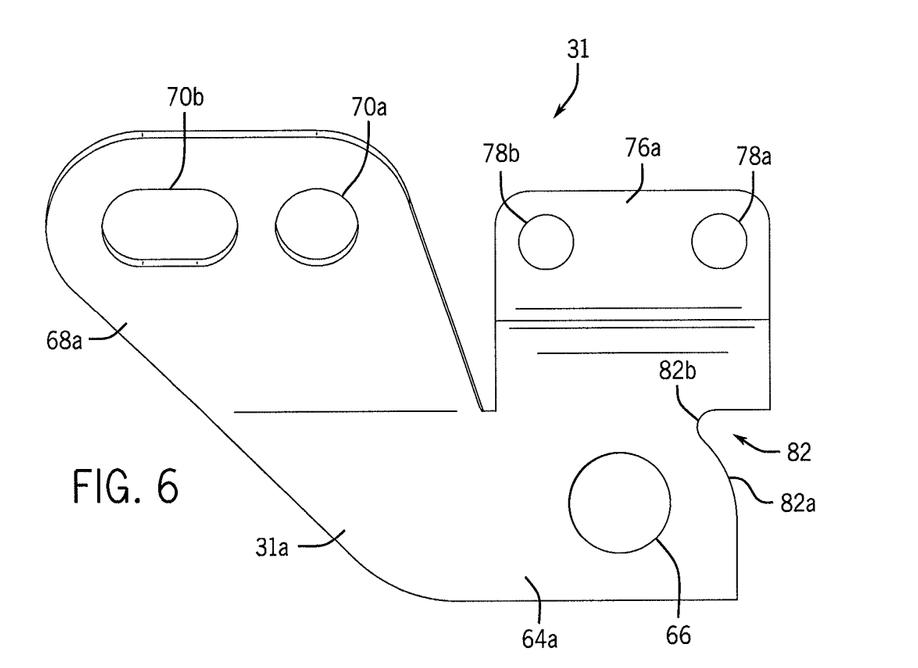
FIG. 6 is a side elevation view of the mounting bracket illustrated in FIG. 4.
Figure 7:
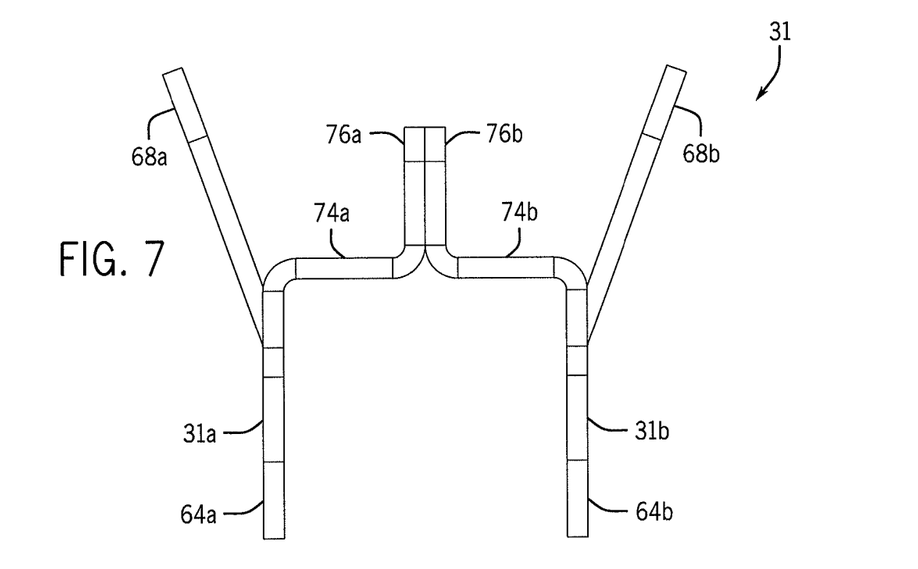
FIG. 7 is a rear elevation view of the mounting bracket illustrated in FIG. 4.
Figure 8:
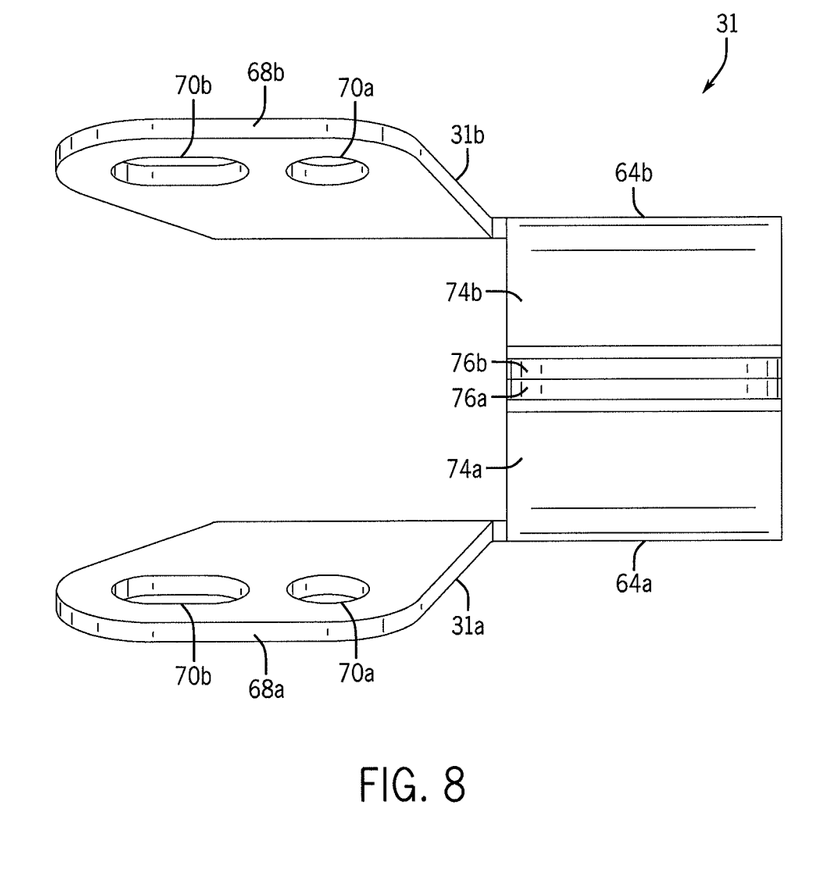
FIG. 8 is a top plan view of the mounting bracket illustrated in FIG. 4.

With reference to FIGS. 6-8, the mounting bracket 31 may include a first sidewall 64a and second sidewall 64b. The first and second sidewalls 64a, 64b may be substantially parallel to one another and extend longitudinally along a direction of travel 66 of the row unit 24 (see FIG. 3). The first and second sidewalls 64a, 64b may be laterally separated apart from each other by a distance slightly larger than a lateral distance between the opposing lateral faces 52 of the hub 42. As such, an inner surface of the first and second sidewalls 64a, 64b of the mounting bracket 31 may confront the opposing lateral faces 52 of the hub 42 when the mounting bracket 31 is pivotably mounted to the chassis 30. A laterally extending aperture 66 may be formed through the first and second sidewalls 64a, 64b and may be sized to receive the cross pin 60. Once assembled, the threaded ends 60b of the cross pin 60 may extend laterally beyond the first and second sidewalls 64a, 64b so that a nut 62 may be threaded onto the threaded ends 60a, 60b of the cross pin 60, thereby securing the mounting bracket 31 to the chassis 30.

A forward portion of each of the first and second sidewalls 64a, 64b may include an attachment ear or wing 68a, 68b extending upwards and laterally outwards from a respective sidewall 64a, 64b. The attachment ears 68a, 68b may be integrally formed with a respective sidewall 64a, 64b. The attachment ears 68a, 68b may diverge from one another as the ears 68a, 68b extend upwards from the sidewalls 64a, 64b.

Each of the attachment ears 68a, 68b may include a set of apertures 70a, 70b extending laterally therethrough. Each aperture 70a, 70b may be configured to receive a fastener 72 (see FIG. 3) to secure a respective attachment ear 68a, 68b to the body 28 of the tail section 24b of the row unit 24. One aperture 70a may be circular and configured to snugly receive the fastener 72, thereby transferring shear loads between the body 28 and the mounting bracket 31. The other aperture 70b may be oversized, such as slotted, to accommodate different hole patterns or tolerances on the body 28, which may vary depending on the type or brand of the body 28.

With reference to FIGS. 4 and 6, an aft or rearward portion of each of the first and second sidewalls 64a, 64b may have a notch or receptacle 82 formed in an aft or rear edge of the sidewalls 64a, 64b. The notch 82 may be configured to receive or seat a stop pin (not shown) projecting laterally from outer faces of the proximal portions 56b, 56c of the cantilevered arms 44b, 44c of the chassis 30. The notch 82 may include an arcuate or curved lead-in surface 82a and an abutment surface or seat 82b. Once a respective stop pin travels along the lead-in surface 82a and contacts the abutment surface 82b of a respective sidewalls 64a or 64b, the interaction between the abutment surface 82b and the stop pin may prevent rotation of the mounting bracket 31 relative to the chassis 30 in a positive rotation or pitch direction 84 about a pivot axis 86 extending through the hub 42 and the cross pin 60. That is, the stop pins may limit the pivotal motion of the mounting bracket 31 about the pivot axis 86 in the rotation direction 84.

With continued reference to FIGS. 6-8, the mounting bracket 31 may include a top wall 74 extending transversely, such as perpendicularly, to the first and second sidewalls 64a, 64b. As illustrated in FIG. 7, the sidewalls 64a, 64b and the top wall 74 define a downwardly-opening channel, which may be a c-shaped channel. As illustrated in FIGS. 6 and 8, the top wall 74 may be positioned aft of or rearwardly from the attachment ears 68a, 68b. A portion of the top wall 74 may be integrally formed with one of the sidewalls 64a, 64b. In one implementation, the top wall 74 is substantially planar and integrally formed with both of the sidewalls 64a, 64b.

As illustrated in FIGS. 6-8, in one implementation the mounting bracket 31 may be comprised of two identical or substantially identical parts, a first part 31a and a second part 31b. In this implementation, each half or part 31a, 31b of the mounting bracket 31 may connect together to form a discontinuous top wall 74 formed of two separate top wall sections 74a, 74b. Each top wall section 74a, 74b may be integrally formed with a respective sidewall 64a, 64b and intersect one another along a mid-section of the mounting bracket 31. Each top wall section 74a, 74b may integrally transition into an upturned or upwardly-directed flange 76a, 76b. Each flange 76a, 76b may include a set of apertures 78a, 78b configured to receive a fastener, such as a bolt 80, for connecting the first and second halves or parts 31a, 31b of the mounting bracket 31 together. As illustrated in FIG. 7, confronting faces of the flanges 76a, 76b may abut or contact each other when the first and second halves 31a, 31b of the mounting bracket 31 are secured together. It is contemplated that these elements may not be identical or substantially identical to one another, and may sufficiently function in such case.

Figure 9:
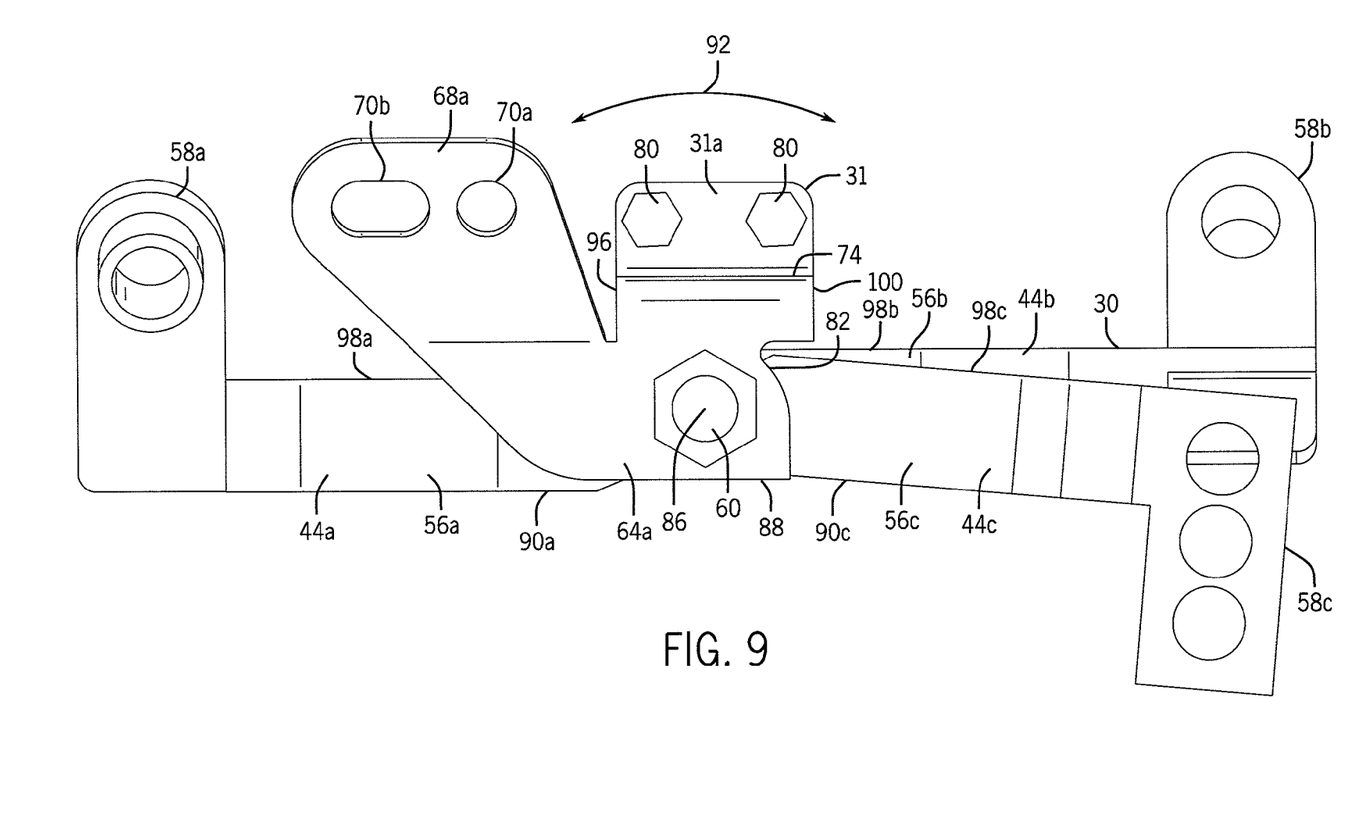
FIG. 9 is a side elevation view of the chassis and the mounting bracket illustrated in FIG. 4.

With reference to FIGS. 2, 3, 9, and 10, the mounting bracket 31 may be pivotably mounted to the chassis 30 and may be axially positioned along the chassis between the longitudinally-staggered wheels 32. As illustrated in FIG. 9, the pivot axis 86 of the mounting bracket 31 may be longitudinally positioned intermediate the distal end portions 58a, 58b of the first and second cantilevered arms 44a, 44b, which may support the press wheels 32 as illustrated in FIGS. 2-3. The pivot axis 86 may be positioned substantially equidistant between the rotation axes of the press wheels 32. The longitudinal positioning of the mounting bracket 31 may enable the wheels 32 to remain in contact with the ground in substantially all field conditions, thereby ensuring consistent closing of a furrow. For example, upon encountering debris or uneven ground in the planting area, the wheels 32 may pivot about the pivot axis 86 to remain in contact with the ground. The central positioning of the mounting bracket 31, which may serve as a load transfer path between the body 28 and the chassis 30, may apply a substantially equal amount of pressure on both press wheels 32, thereby keeping the tail section 24b of the row unit 24 in contact with the ground.

With reference to FIG. 9, the mounting bracket 31 may be configured to not obstruct a bottom profile of the chassis 30. As illustrated in FIG. 9, a lower or bottom edge 88 of the mounting bracket 31 may form a substantially smooth transition between the lower or bottom edges 90a, 90b, 90c of the proximal end portions 56a, 56b, 56c. In this configuration, the bottom profile of the row unit 24 may be substantially smooth and open beneath the chassis 30 and the mounting bracket 31 and between the distal end portions 58a, 58b, 58c of the chassis. This smooth, open bottom profile may allow debris to more easily pass between the chassis 30 and the ground without being caught or lodged, thereby reducing unintended ground disturbances.

The row unit 24 may have more ground clearance as compared to conventional row units due, at least in part, to the configuration of the mounting bracket 31. For example, as the mounting bracket 31 generally does not extend below the lower or bottom edges 90a, 90b, 90c of the chassis 30, the ground clearance of the row unit 24a beneath the chassis 30 and between the wheels 32 may be greater than conventional row units. In some implementations, the mounting bracket 31 provides several inches of additional ground clearance as compared to conventional row units. In one specific implementation, the mounting bracket 31 provides about two inches of additional ground clearance by not impeding beyond a bottom profile of the chassis 30.

Figure 10:
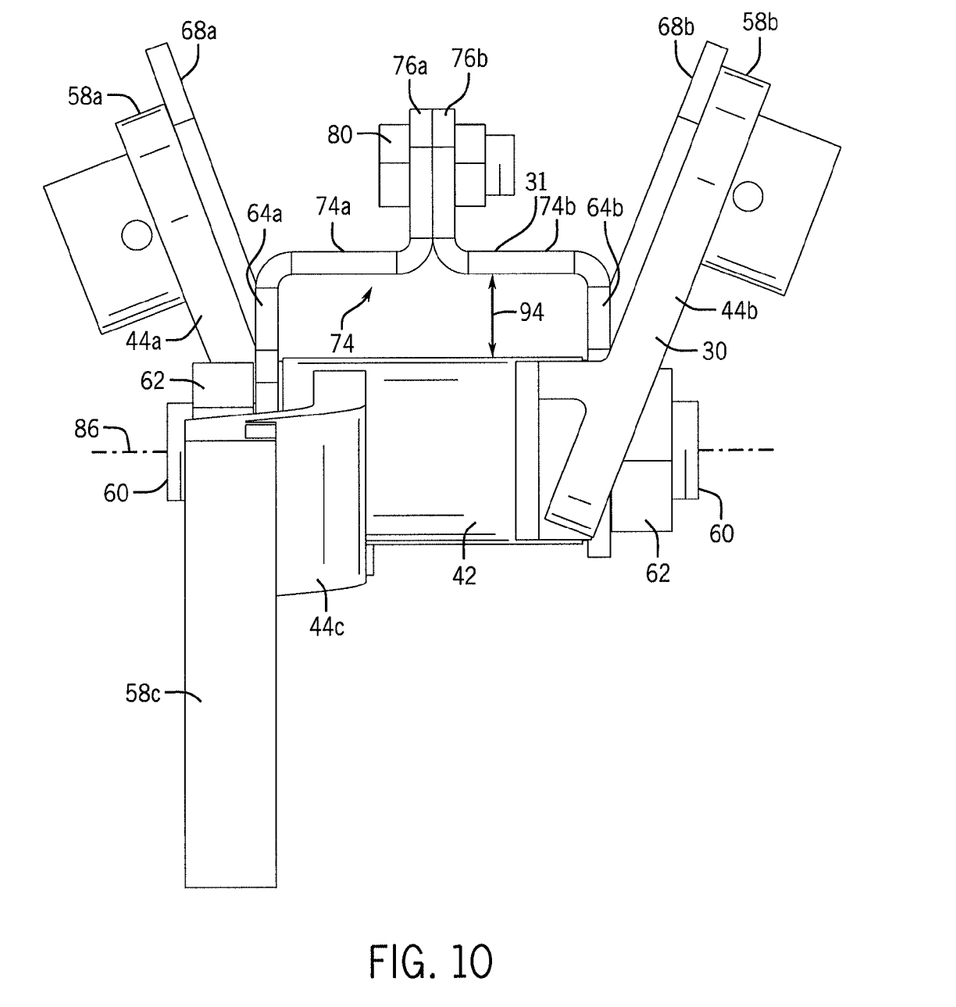
FIG. 10 is a rear elevation view of the chassis and the mounting bracket illustrated in FIG. 4.

With reference to FIGS. 9-10, the mounting bracket 31 may be pivotable about the pivot axis 86 in opposing rotational directions 92. The pivotable range of the mounting bracket 31 may be larger than conventional mounting brackets, which may result in larger wheel travel of the press wheels 32 as compared to conventional row units. With reference to FIG. 10, the hub 42 of the chassis 30 may be positioned laterally between the sidewalls 64a, 64b and beneath the transverse top wall sections 74a, 74b of the mounting bracket 31. The top wall sections 74a, 74b may be generally coplanar with one another and may be positioned a distance or gap 94 above the hub 42. As the transverse top wall 74 of the mounting bracket 31 is positioned above the chassis 30, the distance 94 may be increased without impacting the ground clearance of the chassis 30 or the row unit 24. To increase the distance 94, the height of the sidewalls 64a, 64b may be increased in a direction extending upward from the chassis 30.

An increased distance 94 between the transverse top wall 74 of the mounting bracket 31 and the chassis 30 may result in more travel of the wheels 32 as the chassis 30 may have a larger rotatable range relative to the mounting bracket 31. At one end of the rotatable range of the chassis 30, a front face 96 of the transverse top wall 74 of the mounting bracket 31 may abut or contact a top edge 98a of the proximal end portion 56a of the first cantilevered arm 44a (see FIG. 9). At the other end of the rotatable range of the chassis 30, a rear face 100 of the transverse top wall 74 of the mounting bracket 31 may abut or contact a top edge 98b of the proximal end portion 56b of the second cantilevered arm 44b, which may be positioned above a top edge 98c of the proximal end portion 56c of the third cantilevered arm 44c. As previously discussed, a stop may laterally protrude from a side surface of at least one of the cantilevered arms 44a, 44b, 44c. The at least one stop may be received within a notch or receptacle 82 formed in a sidewall 64a, 64b of the mounting bracket 31 to limit the rotatable range of the chassis 30 relative to the bracket 31. The stop may be formed as a pin with a substantially cylindrical cross-section, for example.

The parts of the row unit 24 may be constructed out of metal (such as aluminum, steel, metal, alloys, etc.), plastic, ceramic, or any other sufficiently strong and durable materials. The individual halves 31a, 31b of the mounting bracket 31 may be welded, bolted, screwed, or otherwise fastened together. Alternatively, the mounting bracket may be formed integrally as a single component by molding, machining, or otherwise fabricating the mounting bracket out of a single piece of material.

The example row unit provided herein may provide numerous advantages relative to conventional row units. For example, the row unit may include more ground clearance relative to conventional row units, which may be achieved without altering the ground clearance between the chassis and the ground. The row unit may include a substantially smooth bottom profile that may reduce debris from being caught or lodged beneath the row unit between the chassis and the ground. In one implementation, a mounting bracket may be configured to not substantially protrude beyond a lower or bottom surface of the chassis. In conventional row units, as a tractor pulls the row unit through the field, debris in the field may be caught, lodged, or wedged between the mounting bracket, the chassis, and/or the ground. By placing the mounting bracket along a top side of the chassis, the mounting bracket generally does not interfere with the ground clearance of the chassis.

As another advantage, the example row unit may include more wheel travel relative to conventional row unit. The additional wheel travel may be achieved by positioning a mounting bracket above the chassis and increasing a distance between a top wall of the mounting bracket and the chassis. The additional distance between a top wall of the mounting bracket and the chassis generally does not impact the ground clearance of the row unit as the top wall of the mounting bracket may be positioned above the chassis. Further, by positioning the mounting bracket along a top side of the chassis, the wheel travel of the row unit may be more consistent during operation as there may be less likelihood of debris being lodged between the mounting bracket and the chassis, which may impede the relative pivotal motion between the mounting bracket and the chassis. That is, the orientation of the mounting bracket may allow the chassis to rotate freely and evenly about a pivot axis, thereby ensuring proper seed and/or fertilizer placement.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

What is claimed is:

1. A row unit for an agricultural planter, comprising:
   a fertilizer system operably coupled to the agricultural planter, the fertilizer system including:
   a body operable to pivotably connect to said agricultural planter;
   a fertilizer disc for creating a fertilizer furrow;
   a bracket connected to the body, the bracket including a transversely-extending top wall and opposing sidewalls extending downwardly from the top wall; and
   a chassis pivotably coupled to the bracket beneath the top wall of the bracket, wherein the fertilizer disc is mounted to the bracket at least in part by the chassis and the chassis is mounted to the body at least in part by the bracket.

2. The row unit of claim 1, wherein the chassis is pivotably coupled to the sidewalls of the bracket.

3. The row unit of claim 2, wherein the sidewalls of the bracket are substantially parallel to one another.

4. The row unit of claim 3, wherein the top wall of the bracket is substantially perpendicular to the sidewalls of the bracket.

5. The row unit of claim 4, wherein the bracket comprises two substantially identical and separable halves.

6. The row unit of claim 5, wherein each half of the bracket includes one of the opposing sidewalls.

7. The row unit of claim 6, wherein each half of the bracket defines a part of the top wall.

8. The row unit of claim 7, wherein each half of the bracket includes an upturned flange.

9. The row unit of claim 8, wherein the upturned flange of one half of the bracket abuts the upturned flange of the other half of the bracket.

10. The row unit of claim 9, wherein the bracket includes diverging attachment ears.

11. The row unit of claim 10, wherein a portion of the body is positioned laterally between the attachment ears.

12. The row unit of claim 11, wherein the chassis includes a hub and a plurality of arms secured to the hub.

13. The row unit of claim 12, wherein the hub is positioned laterally between the opposing sidewalls of the bracket.

14. The row unit of claim 13, wherein the hub is pivotably coupled to the opposing sidewalls of the bracket.

15. The row unit of claim 14, wherein the hub is positioned beneath the top wall of the bracket.

16. The row unit of claim 12, wherein each of the plurality of arms includes a free end configured to support a rotatable device.

17. The row unit of claim 12, wherein the plurality of arms comprises three arms.

18. The row unit of claim 15, further comprising at least two wheels rotatably coupled to the chassis.

19. The row unit of claim 18, wherein the bracket is positioned longitudinally along the chassis between the at least two wheels.

20. The row unit of claim 19, wherein the bracket is positioned substantially equidistant between the at least two wheels.

* * * * *